2,944,983
PROCESS FOR BREAKING PETROLEUM EMULSIONS EMPLOYING CERTAIN OXYALKYLATED TRIS(HYDROXYMETHYL)AMINOMETHANES

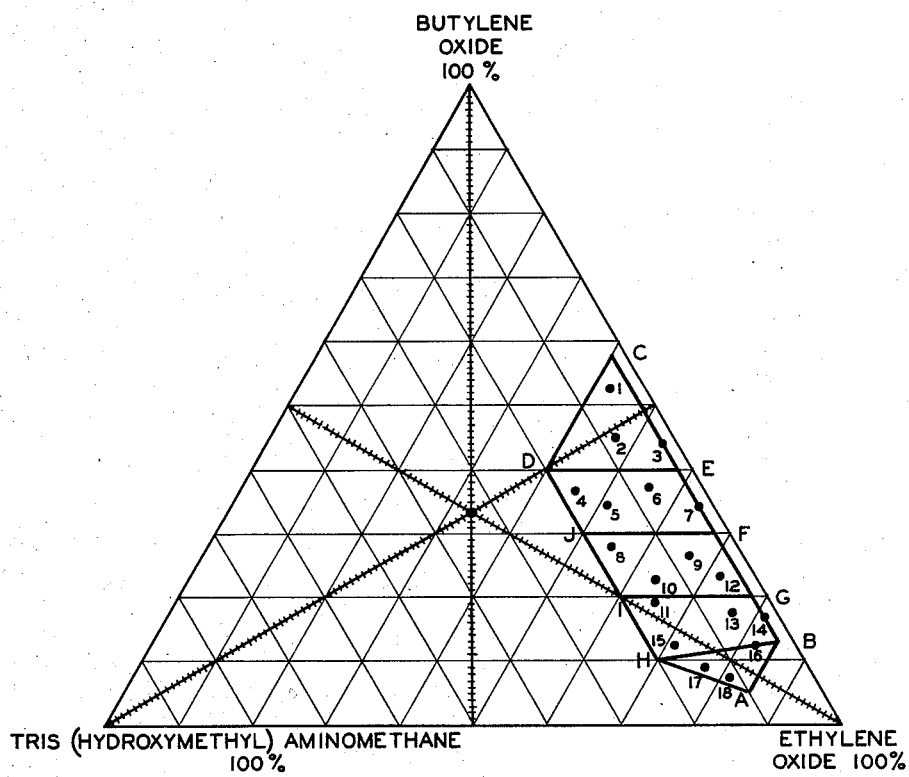

Melvin De Groote, University City, and Owen H. Pettingill, Kirkwood, Mo., assignors to Petrolite Corporation, Wilmington, Del., a corporation of Delaware Filed June 10, 1954, Ser. No. 435,669

20 Claims. (Cl. 252—344)

This invention relates to processes or procedures particularly adapted for preventing, breaking or resolving emulsions of the water-in-oil type, and particularly petroleum emulsions.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts, from pipeline oil.

More specifically then, the present invention is concerned with a process for breaking petroleum emulsions employing a demulsifier including a cogeneric mixture of a homologous series of glycol ethers of tris(hydroxymethyl)aminomethane. The cogeneric mixture is derived exclusively from tris(hydroxymethyl)aminomethane, ethylene oxide and butylene oxide in such weight proportions so the average composition of said cogeneric mixture stated in terms of initial reactants lies approximately within the 5-sided figure of the accompanying drawing in which the minimum tris(hydroxymethyl)aminomethane content is at least 1.75% and which 5-sided figure is identified by the fact that its area lies within the straight lines connecting A, B, C, D, and H.

We have found that when tris(hydroxymethyl)aminomethane is combined with butylene oxide and ethylene oxide in certain proportions and particularly when the butylene oxide is employed first, followed by use of ethylene oxide and more especially if the butylene oxide employed is one of the straight chain isomers

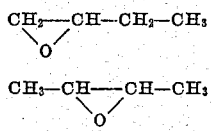

or a mixture of the two and if the composition falls within the limits indicated by the 5-sided figure on the hereto attached triangular chart, said derivatives are of unusual effectiveness for a number of purposes particularly when surface activity is a factor, either directly or indirectly. One example is the use of such derivatives in the resolution of petroleum emulsions of the water-in-oil type.

In a general way the compounds which have been found most effective and fall within the limits of the chart are combinations where one part of tris(hydroxymethyl)aminomethane has been treated with about 11 to 39 parts of butylene oxide, by weight, and then reacted with 27 to 58.5 parts of ethylene oxide.

In another series 10 parts of tris(hydroxymethyl)aminomethane have been reacted with 6 parts by weight of butylene oxide and 85 parts by weight of ethylene oxide. In another series 1.5 parts by weight of tris(hydroxymethyl)aminomethane have been reacted with 13.5 parts by weight of butylene oxide and 85 parts by weight of ethylene oxide. Similarly, in another series the following combinations have been used: 1.5 parts of tris(hydroxymethyl)aminomethane combined with 58.5 parts by weight of butylene oxide and 40 parts by weight of ethylene oxide; 20 parts by weight of tris(hydroxymethyl)aminomethane, reacted with 40 parts by weight of butylene oxide and then with 40 parts by weight of ethylene oxide. In another series 20 parts by weight of tris(hydroxymethyl)aminomethane were reacted with 10 parts by weight of butylene oxide and then 70 parts by weight of ethylene oxide.

It is of interest to note in some instances as little as 1.75 parts of tris(hydroxymethyl)aminomethane may be combined with 98.25 parts of the two oxides to produce very valuable derivatives.

We have also found that where part of the butylene oxide is replaced by propylene oxide, i.e., where a combination of tris(hydroxymethyl)aminomethane, butylene oxide, propylene oxide and ethylene oxide are used, effective and valuable surface-active agents can also be obtained. This, however, represents a separate invention.

For the purpose of resolving petroleum emulsions of the water-in-oil type, we prefer to employ oxyalkylated derivatives, which are obtained by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The above mentioned test, i.e., a conventional emulsification test, simply means that the preferred product for demulsification is soluble in a solvent having hydrophobe properties or in an oxygenated water insoluble or even a fraction of a water-soluble hydrocarbon solvent and that when shaken with water the product may remain in the nonaqueous solvent or, for that matter, it may pass into the aqueous solvent. In other words, although it is xylene soluble, for example, it may also be water soluble to an equal or greater degree.

For purposes of convenience what is said hereinafter will be divided into three parts:

Part 1 is concerned with the oxyalkylation of tris(hydroxymethyl)aminomethane in general;

Part 2 is concerned with the oxyalkylation of tris(hydroxymethyl)aminomethane using two different oxides, i.e., butylene oxide and ethylene oxide so as to produce derivatives falling within certain composition limitations hereinafter noted in detail. For convenience, Part 2 is divided into two sections, Section A is concerned with oxybutylation and oxyethylation broadly, and Section B is concerned with the particular composition corresponding to the herein specified compositions and illustrate such combinations;

Part 3 is concerned with the resolution of petroleum emulsions of the water-in-oil type by means of the previously described chemical compounds.

PART 1

At the present time there is available butylene oxide which includes isomeric mixtures, for instance, one manufacturer has previously supplied a mixed butylene oxide which is in essence a mixture of 1-butene oxide, 2-butene oxide isomers and approximately 10% isobutylene oxide. Another manufacturer has supplied an oxide which is roughly a fifty-fifty mixture of the cis- and trans-isomers of 2-butene oxide.

There is also available a butylene oxide which is characterized as straight chain isomers being a mixture of the 1,2 and the 2,3 isomers and substantially free from the isobutylene oxide.

This latter product appears to consist of 80% of the 1,2 isomer and 15% of the mixed 2,3 cis- and 2,3 trans-isomer. We have obtained the best results by using an oxide that is roughtly 80% or more of the 1,2 isomer and with either none, or just a few percent if any, of the isobutylene oxide, the difference being either form of the 2,3 or a mixture of the two forms.

Our preference is to use an oxide substantially free from the isobutylene oxide, or at least having minimum amounts of isobutylene oxide present.

Since the varying solubility of different butanols is well known, it is unnecessary to comment on the effect that the varying structure has on solubility of derivatives obtained by butylene oxide. Purely by way of example, the applicants have tested the solubility of the first two available butylene oxides and noted in one instance the butylene oxide would dissolve to the extent of 23 grams in 100 grams of water, whereas the other butylene oxide would only dissolve to the extent of 6 grams in 100 grams of water. These tests were made at 25° C.

As to further reference in regard to the isomeric butylene oxides see "Chemistry of Carbon Compounds," volume I, part A, "Aliphatic Compounds," edited by E. H. Rodd, Elsevier Publishing Company, New York, 1951, page 671.

As to the difference in certain proportions of the cis- and trans-form of straight chain isomers 2,3-epoxybutane see page 341 of "A Manual of Organic Chemistry," volume 1, G. Malcolm Dyson, Longmans, Green and Company, New York, 1950.

Reference to butylene oxide herein of course is to the compound or compounds having the oxirane ring and thus excludes 1,4-butylene oxide (tetrahydrofurane) or a trimethylene ring compound.

When reference is made to the oxides, for instance, ethylene oxide and butylene oxide, one can use the corresponding carbonates. Ethylene carbonate is available commercially. Butylene carbonate, or the carbonate corresponding to a particular oxide, is not available commercially but can be prepared by the usual methods in the laboratory. For this reason further reference to the alkylene carbonates will be ignored although it is understood when oxyethylation takes place by means of ethylene carbonate one could, of course, use butylene carbonate for oxybutylation.

In the present invention we have found that outstanding products are obtained by the use of certain preferred butylene oxides, i.e., those entirely free or substantially free (usually 1% or less) and composed of approximately 85% or more of the 1,2 isomer with the remainder, if any, being the 2,3 isomer.

In the preparation of the outstanding compounds we have studiously avoided the presence of the isobutylene oxide as far as practical. When any significant amount of isobutylene oxide happens to be present, the results are not as satisfactory regardless of the point when the butylene oxide is introduced. One explanation may be the following. The initial oxybutylation which may be simplified by reference to a monohydric alcohol, produces a tertiary alcohol. Thus the oxybutylation in the presence of an alkaline catalyst may be shown thus:

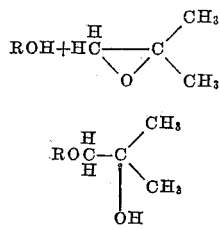

Further oxyalkylation becomes difficult when a tertiary alcohol is involved although the literature records successful oxyalkylation of tertiary alcohols. This does not necessarily apply when oxyalkylation takes place in the presence of an acidic catalyst, for instance, a metallic chloride such as ferric chloride, stannic chloride, aluminum chloride, etc. We are not completely satisfied that oxyalkylation of tris(hydroxymethyl)aminomethane in presence of an acidic catalyst may not cause some degradation, possibly etherization or dehydration takes place. The situation is somewhat akin to sorbitol which involves similar derivatives. Thus, oxyalkylation under such conditions may involve tris(hydroxymethyl)aminomethane in part and may involve tris(hydroxymethyl) aminomethane degradation products in part and also may involve water in part. We have tried procedures such as using an alkaline catalyst and tris(hydroxymethyl)aminomethane, employing about 4 to 6 moles of isobutylene oxide. Afterwards, an amount of acid was added equal to the amount of caustic used as a catalyst and the reaction mass was dried and then stannic chloride added. Under such circumstances the results suggest more satisfactory oxybutylation as such although the procedure becomes cumbersome, uneconomical and perhaps even impractical.

This, however, seems to be only a partial explanation. Another explanation may rest with the fact that isobutylene oxide may show a tendency to revert back to isobutylene and oxygen and this oxygen may tend to oxidize the terminal hydroxyl radicals. This possibility is purely a matter of speculation, but may account for the reason we obtain much better results using a butylene oxide as specified. In regard to this reaction, i.e., possible conversion of an alkylene oxide back to the olefin and nascent oxygen, see "Tall Oil Studies II, Decolorization of Polyethenoxy Tallates With Ozone and Hydrogen Peroxide," J. V. Karabinos et al., J. Am. Oil Chem. Soc. 31, 71 (1954).

In order to illustrate why the herein contemplates compounds or said products are cogeneric mixtures and not single chemical compounds, and why they must be described in terms of manufacture, and molal ratio or percentage ratio of reactants, reference is made to a monohydric alcohol. Tris(hydroxymethyl)aminomethane is a polyhydric alcohol having 3 reactive hydrogen atoms attached to oxygen and also 2 attached to nitrogen. Thus, for the present purpose it might be considered the same as an amino alcohol having 5 hydroxyl radicals. However, for the moment, one can forget the hydrogen atoms attached to nitrogen and even the plurality of hydroxyl radicals and simply consider what happens when a monohydric alcohol is subjected to oxyalkylation.

If one selects any hydroxylated compound and subjects such compound to oxyalkylation, such as oxyethylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent which, for sake of convenience, may be indicated as $RO(C_2H_4O)_{30}H$. Instead, one obtains a cogeneric mixture of closely related homologous compounds in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i.e., the ability to describe how to make the product under consideration and how to repeat such production time after time without difficulty, it is necessary to resort to some other method of description.

What has been said in regard to a monohydric compound of course is multiplied many times in the case of a polyhydric compound such as tris(hydroxymethyl) aminomethane. This is particularly true even in regard to ethylene oxide alone but becomes even more complicated when butylene oxide is used in light of what has been said previously in regard to the isomers of butylene oxide.

PART 2

Section A

The oxyalkylation of an amine, particularly a primary amine or secondary amine or a hydroxylated amine regardless of whether it is primary, secondary, or tertiary, is comparatively simple and has been described repeatedly in the literature. If the product is a liquid such as triethanolamine one can proceed to treat with an alkylene oxide such as ethylene oxide, propylene oxide, or butylene oxide, at least in the early stages if desired without adding any catalyst. Generally speaking, if oxyalkylation is rather extensive as in the present instance, one requires a catalyst after the initial stage and it is just as simple to add it from the very beginning. If the amine is a solid at ordinary temperature and this is true in regard to tris(hydroxymethyl)aminomethane, one can readily follow the procedure of using a slurry in the same manner that is employed in connection with other solids although not necessarily nitrogen-containing. Reference is made to products such as sorbitol, sucrose, glucose, pentaerythritol, dipentaerythritol, etc.

Specific reference is made to the instant application which is concerned with ethylene oxide, and butylene oxide, or the equivalents. Actually, whether one uses ethylene oxide or butylene oxide, one preferably starts with either the powdered amine suspended as a slurry in xylene or a similar inactive solvent; or one employs an alkylene carbonate such as ethylene carbonate or butylene carbonate, for the initial oxyalkylation. When such initial oxyalkylation has gone far enough to convert the solid mass into a product which is at least liquid at oxyalkylation temperature it can be subjected to the oxides as differentiated from the carbonates. The carbonates, of course, cost more than the oxides.

In any event, any one of a number of well known procedures may be employed and reference has been made to U.S. Patent No. 2,652,394, dated September 15, 1953, to De Groote. This particular patent happens to be concerned with sucrose but, as a matter of fact, one can just as readily substitute tris(hydroxymethyl)aminomethane and the reaction will go just as rapidly and, in fact, perhaps more rapidly than with sucrose. Referring to said aforementioned patent, the same procedure using propylene oxide, or ethylene oxide, can be employed simply using butylene oxide instead.

It is not believed any examples are necessary to illustrate such well known procedure but for purpose of illustration the following are included:

Example 1a

The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 500 grams of tris(hydroxymethyl)aminomethane, 300 grams of xylene, and 15 grams of sodium methylate. The autoclave was sealed, swept with nitrogen gas and stirring started immediately and heat applied. The temperature was allowed to rise to approximately 150° C. At this particular time the addition of butylene oxide was started. The butylene oxide employed was a mixture of the straight chain isomers substantially free from isobutylene oxide. It was added continuously at such speed that it was absorbed by the reaction as added. The amount added in this operation was 1500 grams. The time required to add the butylene oxide was two hours. During this period the temperature was maintained at 135° to 150° C., using cooling water through the inner coils when necessary and otherwise applying heat if required. The maximum pressure during the reaction was 50 pounds per square inch. Ignoring the xylene and sodium methylate and considering the only tris(hydroxymethyl)-aminomethane for convenience, the resultant product represent 3 parts by weight of butylene oxide to one part by weight of tris(hydroxymethyl)aminomethane. The xylene present represented approximately .6 of one part by weight.

Example 2a

The reaction mass was transferred to a larger autoclave (capacity 15 liters). Without adding any more catalyst or any more xylene the procedure was repeated so as to add another 1500 grams of butylene oxide under substantially the same operating conditions but requiring about 3 hours for the addition. At the end of this step the ratio represented approximately 6 to 1 (ratio butylene oxide to tris(hydroxymethyl)aminomethane.

Example 3a

In a third step, instead of adding 1500 grams of butylene oxide, 1625 grams were added. The reaction slowed up and required approximately 6 hours, using the same operating temperatures and pressures. The ratio at the end of the third step was 9.25 parts by weight of butylene oxide per weight of tris(hydroxymethyl)aminomethane.

Example 4a

At the end of this step the autoclave was opened and an additional 5 grams of sodium methylate added, the autoclave flushed out as before, and the fourth and final oxyalkylation completed, using 1625 grams of butylene oxide, and the oxyalkylation was complete within 3¼ hours using the same temperature range and pressure as previously. At the end of the reaction the product represented approximately 12.5 parts of butylene oxide by weight to one part of tris(hydroxymethyl)aminomethane.

All the examples, except the first step, were substantially water-insoluble and xylene-soluble.

As has been pointed out previously these oxybutylated tris(hydroxymethyl)aminomethane were subjected to oxyethylation in the same manner described in respect to the oxypyropylated sucrose in aforemention U.S. Patent No. 2,652,394. Indeed, the procedure is comparatively simple for the reason that one is working with a liquid and also that ethylene oxide is more reactive than butylene oxide. As a result, using the same amount of catalyst one can oxyethylate more rapidly than usually at a lower pressure. There is no substantial difference as far as operating procedure goes whether one is oxyethylating oxypropylated tris(hydroxymethyl)aminomethane or oxybutylated tris(hydroxymethyl)aminomethane.

The same procedure using a slurry of tris(hydroxymethyl)aminomethane in xylene was employed in connection with ethylene oxide and the same mixture on a percentage basis was obtained as in the above examples where butylene oxide and tris(hydroxymethyl)aminomethane were used.

The same procedures have been employed using other butylene oxides including mixtures having considerable isobutylene oxide and mixtures of the straight chain isomers with greater or lesser amounts of the 2,3 isomer.

Where reference has been made in previous examples to the straight chain isomer, the product used was one which was roughly 85% or more of the 1,2 isomer and approximately 15% of the 2,3-cis- and the 2,3-transisomer with substantially none or not over 1% of the isobutylene oxide.

In the preceding procedures one oxide has been added and then the other. One need not follow this procedure. The two oxides can be mixed together in suitable proportions and subsequently subjected to joint oxyalkylation so as to obtain products coming within the specified limits. In such instances, of course, the oxyalkylation may be described as random oxyalkylation insofar that one cannot determine the exact location of the butylene oxide or ethylene oxide groups. In such instances the procedure again is identically the same as previously described and, as a matter of fact, we have used such methods in connection with tris(hydroxymethyl)aminomethane.

If desired, one may add part of one oxide and all of the other and then return to the use of the first oxide, for instance; or one may use the procedure as previously, adding first some butylene oxide, then ethylene oxide and then the butylene oxide. Or, inversely, one may add some ethylene oxide, then all butylene oxide and then the remainder of the ethylene oxide; or either oxide could be added in portions so that first one oxide is added, then the other, then the first oxide is added again, and then the second oxide. We have found no advantage in so doing. Indeed, our preference has been to add all the butylene oxide first and then the required amount of ethylene oxide.

Any suitable catalyst which promotes oxyalkylation may be employed, provided its use is not incompatible with the use of an alkylene reactant, especially in the initial stage. It is our preference, however, to use a catalyst such as sodium methylate, caustic soda, or the like.

Actually, tris(hydroxymethyl)aminomethane at times may contain a trace of moisture. Our preference is to prepare the slurry with an excess of xylene and distill off a part of the xylene so as to remove any trace of water and then flush out the mass with nitrogen. Even so, there may be a few tenths of a percent of moisture remain although at times examination indicates at the most it is merely a trace.

PART 2

Section B

In light of what has been said previously, particularly in Section A, it is obvious that hardly any directions are required to produce the compounds herein specified. However, referring to the composition of the initial reactants based on the 5-sided figure in the attached drawing, it will be noted we have calculated the percentage of the three initial reactants for the points A, B, C, D, E, F, G, H, I and J which appear on the boundary of the 5-sided figure and also determine the five sub-divided parts of the 5-sided figure, two parts being triangles and the others being two parallelograms, and one trapezoid. Likewise we have calculated the composition for a number of examples within the area of the graph and corresponding to points 1 to 18, inclusive. Note these data are included in Table I, immediately following:

TABLE I

| Points on Boundary of Area | Tertiary Mixture, Percent Basis | | | Binary Intermediate Mixtures, Percent Basis | | | |
|---|---|---|---|---|---|---|---|
| | Tris(hydroxymethyl)aminomethane | Butylene Oxide | Ethylene Oxide | Tris(hydroxymethyl)aminomethane | Butylene Oxide | Tris(hydroxymethyl)aminomethane | Ethylene Oxide |
| A | 10.0 | 5.0 | 85.0 | 66.6 | 33.4 | 10.5 | 89.5 |
| B | 1.5 | 13.5 | 85.0 | 10.0 | 90.0 | 1.7 | 98.3 |
| C | 1.5 | 58.5 | 40.0 | 2.5 | 97.5 | 3.6 | 96.4 |
| D | 20.0 | 40.0 | 40.0 | 33.4 | 66.6 | 33.4 | 66.6 |
| E | 1.5 | 40.0 | 58.5 | 3.6 | 96.4 | 2.5 | 97.5 |
| F | 1.5 | 30.0 | 68.5 | 4.75 | 95.25 | 2.14 | 97.86 |
| G | 1.5 | 20.0 | 78.5 | 7.0 | 93.0 | 1.87 | 98.13 |
| H | 20.0 | 10.0 | 70.0 | 66.6 | 33.4 | 22.2 | 77.8 |
| I | 20.0 | 20.0 | 60.0 | 50.0 | 50.0 | 25.0 | 75.0 |
| J | 20.0 | 30.0 | 50.0 | 40.0 | 60.0 | 28.6 | 71.4 |
| 1 | 5.0 | 52.5 | 42.5 | 8.68 | 91.32 | 10.5 | 89.5 |
| 2 | 8.0 | 44.0 | 48.0 | 15.4 | 84.5 | 14.3 | 85.7 |
| 3 | 1.5 | 54.5 | 44.0 | 2.68 | 97.32 | 3.3 | 96.7 |
| 4 | 18.0 | 36.5 | 45.5 | 33.0 | 67.0 | 28.3 | 71.7 |
| 5 | 15.0 | 33.5 | 51.5 | 31.0 | 69.0 | 22.6 | 77.4 |
| 6 | 7.5 | 36.5 | 56.0 | 17.1 | 82.9 | 11.8 | 88.2 |
| 7 | 1.5 | 34.5 | 64.0 | 4.16 | 95.84 | 2.3 | 97.7 |
| 8 | 17.0 | 28.0 | 55.0 | 37.7 | 62.3 | 23.6 | 76.4 |
| 9 | 7.0 | 26.0 | 67.0 | 21.2 | 78.8 | 9.5 | 90.5 |
| 10 | 13.5 | 22.5 | 64.0 | 37.5 | 62.5 | 17.4 | 82.6 |
| 11 | 15.5 | 19.0 | 65.5 | 44.8 | 55.2 | 19.2 | 80.8 |
| 12 | 4.5 | 23.0 | 72.5 | 16.35 | 83.65 | 5.85 | 94.15 |
| 13 | 6.0 | 17.0 | 77.0 | 26.1 | 73.9 | 7.2 | 92.8 |
| 14 | 1.5 | 17.0 | 81.5 | 8.1 | 91.9 | 1.8 | 08.2 |
| 15 | 16.0 | 12.5 | 71.5 | 56.2 | 43.8 | 18.3 | 81.7 |
| 16 | 4.5 | 13.0 | 82.5 | 25.7 | 74.3 | 5.2 | 94.8 |
| 17 | 13.5 | 9.0 | 77.5 | 60.0 | 40.0 | 14.8 | 85.2 |
| 18 | 11.5 | 7.0 | 81.5 | 62.1 | 37.9 | 12.35 | 87.65 |

Note the first column gives the particular point on the boundary of the 5-sided figure or within the 5-sided figure area. Note the next three columns represent the tertiary mixture which corresponds to the initial reactants, to wit, the percentages, by weight, of tris(hydroxymethyl)aminomethane butylene oxide and ethylene oxide. Thus it is apparent that one could select any particular point and simply use the appropriate number of pounds of oxide; for instance, in regard to a point A all that would be necessary would be to mix 5 pounds of butylene oxide with 85 pounds of ethylene oxide and use the mixture to oxyalkylate 10 pounds of tris(hydroxymethyl)-aminomethane.

Similarly, in Example B, one need only mix 13.5 pounds of butylene oxide with 85 pounds of ethylene oxide and use the mixture to oxyalkylate 1.5 pounds of tris(hydroxymethyl)aminomethane.

Note the fifth and sixth columns represent binary intermediate mixtures. For instance, in regard to the various points on the boundary and within the 5-sided figure area, we have calculated the initial mixture using tris(hydroxymethyl)aminomethane and butylene oxide in the first case, and using tris(hydroxymethyl)aminomethane and ethylene oxide in the second case, which would be employed for subsequent oxyalkylation to give the particular composition required. Note that a binary intermediate for the preparation of point A can be prepared in any suitable manner involving 66.6% of tris-(hydroxymethyl)aminomethane and 33.4% of butylene oxide. Thus, for example, one could use 66.6 pounds of tris(hydroxymethyl)aminomethane and 33.4 pounds of butylene oxide, or on a larger scale one could use 666 pounds of tris(hydroxymethyl)aminomethane and 334 pounds of butylene oxide.

Referring now to the tertiary mixture table, it is apparent that for point A tris(hydroxymethyl)aminomethane and butylene oxide together represent 15%, and ethylene oxide 85%. Therefore, one could employ 15 pounds of the binary mixture and react it with 85 pounds of ethylene oxide.

Similarly, in regard to the fifth and sixth columns for point B, the initial mixture involved tris(hydroxymethyl)-aminomethane and butylene oxide, representing 10% of tris(hydroxymethyl)aminomethane and 90% of butylene oxide. If desired, 10 pounds of tris(hydroxymethyl)-aminomethane could be reacted with 90 pounds of butylene oxide. Such mixture need only be reacted with ethylene oxide by reacting 15 pounds of the mixture with 85 pounds of ethylene oxide. This is obvious from the data in regard to the tertiary mixtures.

Referring now to columns 7 and 8, it is obvious one could readily produce an oxyethylated tris(hydroxymethyl)aminomethane and then subject it to reaction with butylene oxide. Using this procedure in regard to A, it is obvious that the mixture represents 10.5 of tris-(hydroxymethyl)aminomethane and 89.5% of ethylene oxide. This product could be obtained from a binary mixture of 105 pounds of tris(hydroxymethyl)aminomethane and 895 pounds of ethylene oxide.

Referring now to the tertiary mixture table, it is obvious that 95 pounds of such mixture could be reacted with 5 pounds of butylene oxide to give point A. Similarly, in regard to point B the oxyethylated tris(hydroxymethyl)aminomethane represents 1.7% of tris(hydroxymethyl)aminomethane and 98.3% ethylene oxide. The mixture so obtained by referring to the tertiary mixture table would be reacted with butylene oxide in the proportion of 86.5 pounds of the mixture and 13.5 pounds of butylene oxide.

As previously pointed out, the oxyalkylation of tris-(hydroxymethyl)aminomethane, or comparable hydroxylated amines has been described in the literature and is described also in detail above. All one need do is employ such conventional oxylation procedure to obtain products corresponding to the compositions as defined. Attention is again directed to the fact that one need not add the entire amount of either oxide at one time but that a small portion of one could be added and then another small portion of the other, and the process repeated.

Purely for purpose of illustration, we have prepared examples three different ways corresponding to the compositions shown on the chart. In the first series the butylene oxides and ethylene oxide were mixed; this series is indicated as A$a$, B$a$, through and including 18$a$; in the second series butylene oxide was used first followed by ethylene oxide and this series indicated A$b$, B$b$, through and including 18$b$; and finally in the third series ethylene oxide was used followed by butylene oxide and the series identified as A$c$, B$c$, through and including 18$c$.

TABLE II

| Composition Corresponding to Following Point | Composition where Oxides are Mixed Prior to Oxyalkylation | Composition where Butylene Oxide Used First Followed by Ethylene Oxide | Composition where Ethylene Oxide Used First Followed by Butylene Oxide |
|---|---|---|---|
| A | A$a$ | A$b$ | A$c$ |
| B | B$a$ | B$b$ | B$c$ |
| C | C$a$ | C$b$ | C$c$ |
| D | D$a$ | D$b$ | D$c$ |
| E | E$a$ | E$b$ | E$c$ |
| F | F$a$ | F$b$ | F$c$ |
| G | G$a$ | G$b$ | G$c$ |
| H | H$a$ | H$b$ | H$c$ |
| I | I$a$ | I$b$ | I$c$ |
| J | J$a$ | J$b$ | J$c$ |
| 1 | 1$a$ | 1$b$ | 1$c$ |
| 2 | 2$a$ | 2$b$ | 2$c$ |
| 3 | 3$a$ | 3$b$ | 3$c$ |
| 4 | 4$a$ | 4$b$ | 4$c$ |
| 5 | 5$a$ | 5$b$ | 5$c$ |
| 6 | 6$a$ | 6$b$ | 6$c$ |
| 7 | 7$a$ | 7$b$ | 7$c$ |
| 8 | 8$a$ | 8$b$ | 8$c$ |
| 9 | 9$a$ | 9$b$ | 9$c$ |
| 10 | 10$a$ | 10$b$ | 10$c$ |
| 11 | 11$a$ | 11$b$ | 11$c$ |
| 12 | 12$a$ | 12$b$ | 12$c$ |
| 13 | 13$a$ | 13$b$ | 13$c$ |
| 14 | 14$a$ | 14$b$ | 14$c$ |
| 15 | 15$a$ | 15$b$ | 15$c$ |
| 16 | 16$a$ | 16$b$ | 16$c$ |
| 17 | 17$a$ | 17$b$ | 17$c$ |
| 18 | 18$a$ | 18$b$ | 18$c$ |

The products obtained by the above procedure usually show some color varying from reddish amber to reddish black. They can be bleached in the usual fashion using bleaching clays, charcoal, or an organic bleach, such as peroxide or peracetic acid, or the like.

Such products also have present a small amount of alkaline catalyst which can be removed by conventional means or they can be neutralized by adding an equivalent amount of acid, such as hydrochloric acid. For many purposes the slight amount of residual alkalinity is not objectionable.

There are certain variants which can be employed without detracting from the metes and bounds of the invention, but for all practical purposes there is nothing to be gained by such variants and the result is merely increased cost. For instance, any one of the two oxides can be replaced to a minor percentage and usually to a very small degree, by oxide which would introduce substantially the same group along with a side chain, for instance, one could employ glycidyl methylether, glycidyl ethyl ether, glycidyl isopropyl ether, glycidyl butyl ether or the like.

Increased branching also may be effected by the use of an imine instead of a glycide, or a methyl glycide. Thus one can use ethylene imine, or propylene imine in the same way described for glycide or methyl glycide. An additional effect is obtained due to the basicity of the nitrogen atom. The same thing is true as far as the inclusion of nitrogen atoms if one uses a compound of the kind previously described such as a dialkylaminoepoxypropane. Excellent products are obtained by reacting tris(hydroxymethyl)aminomethane with one to six moles of ethylene imine and then proceeding in the same manner herein described.

In the hereto appended claims reference has been made to "glycol ethers of tris(hydroxymethyl)aminomethane." Actually it well may be that the products should be referred to as "polyol ethers of tris(hydroxymethyl)aminomethane" in order to emphasize the fact that the final products of reaction have more than two hydroxyl radicals. However, the products may be considered as hypothetically derived by reaction of tris(hydroxymethyl)aminomethane with the glycols, such as ethylene glycol, butylene glycol, propylene glycol, or polyglycols. For this reason there seems to be a preference to use the terminology "glycol ethers of tris(hydroxymethyl)aminoethane."

PART 3

As to the use of conventional demulsifying agents, reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 18b, herein described.

Having thus described our invention, what we claim as new and desire to secure by Letters Patent is:

1. A process for breaking petroleum emulsions of the water-in-oil type characterized by subjecting the emulsion to a demulsifying agent including cogeneric mixture of a homologous series of glycol ethers of tris(hydroxymethyl)aminomethane; said cogeneric mixture being derived exclusively from tris(hydroxymethyl) aminomethane, ethylene oxide and butylene oxide in such weight proportions so the average composition of said cogeneric mixture, stated in terms of initial reactants, lies approximately within the 5-sided figure of the accompanying drawing in which the minimum tris(hydroxymethyl) aminomethane content is at least 1.75% and which 5-sided figure is identified by the fact that its area lies within the straight lines connecting A, B, C. D, and H.

2. The process of claim 1 with the proviso that oxyalkylation takes place in presence of an alkaline catalyst.

3. The process of claim 1 with the proviso that oxyalkylation takes place in presence of an alkaline catalyst and that the butylene oxide be added first.

4. The process of claim 1 with the proviso that oxyalkylation takes place in presence of an alkaline catalyst and that the butylene oxide be added first, and with the further proviso that the butylene oxide is substantially free from isobutylene oxide.

5. The process of claim 1 with the proviso that oxyalkylation takes place in presence of an alkaline catalyst and that the butylene oxide be added first, and with the further proviso that the butylene oxide consists of 85% or more of the 1,2-isomer and approximately 15% or less of the 2,3-isomeric form, and is substantially free from isobutylene oxide.

6. The process of claim 5 with the proviso that the reactant composition falls within the triangular area defined by C, D, and E.

7. The process of claim 5 with the proviso that the reactant composition falls within the parallelogram D, E, F, and J.

8. The process of claim 5 with the proviso that the reactant composition falls within the parallelogram J, F, G, and I.

9. The process of claim 5 with the proviso that the reactant composition falls within the trapezoid I, G, B, and H.

10. The process of claim 5 with the proviso that the reactant composition falls within the triangle H, B, A.

11. A process for breaking petroleum emulsions of the water-in-oil type characterized by subjecting the emulsion to a demulsifying agent including a cogeneric mixture of a homologous series of glycol ethers of tris(hydroxymethyl)aminomethane; said cogeneric mixture being derived exclusively from tris(hydroxymethyl)-aminomethane, ethylene oxide and butylene oxide in such weight proportions so the average composition of said cogeneric mixture, stated in terms of initial reactants, lies approximately within the 5-sided figure of the accompanying drawing in which the minimum tris(hydroxymethyl)-aminomethane content is at least 1.75% and which 5-sided figure is identified by the fact that its area lies within the straight lines connecting A, B, C, D, and H; with the proviso that the hydrophile properties of said cogeneric mixture in an equal weight of xylene are sufficient to produce an emulsion when said xylene solution is shaken vigorously with one to three volumes of water.

12. The process of claim 11 with the proviso that oxyalkylation takes place in presence of an alkaline catalyst.

13. The process of claim 11 with the proviso that oxyalkylation takes place in presence of an alkaline catalyst and that the butylene oxide be added first.

14. The process of claim 11 with the proviso that oxyalkylation takes place in presence of an alkaline catalyst and that the butylene oxide be added first, and with the further proviso that the butylene oxide is substantially free from isobutylene oxide.

15. The process of claim 11 with the proviso that oxyalkylation takes place in presence of an alkaline catalyst and that the butylene oxide be added first, and with the further proviso that the butylene oxide consists of 85% or more of the 1,2-isomer and approximately 15% or less of the 2,3-isomeric form, and is substantially free from isobutylene oxide.

16. The process of claim 15 with the proviso that the reactant composition falls within the triangular are defined by C, D, and E.

17. The process of claim 15 with the proviso that the reactant composition falls within the parallelogram D, E, F, and J.

18. The process of claim 15 with the proviso that the reactant composition falls within the parallelogram J, F, G, and I.

19. The process of claim 15 with the proviso that the reactant composition falls within the trapezoid I, G, B, and H.

20. The process of claim 15 with the proviso that the reactant composition falls within the triangle H, B, A.

References Cited in the file of this patent

UNITED STATES PATENTS

| | | |
|---|---|---|
| 2,233,383 | De Groote | Feb. 25, 1941 |
| 2,262,736 | De Groote et al. | Nov. 11, 1941 |
| 2,290,416 | De Groote et al. | July 21, 1942 |
| 2,457,634 | Bond et al. | Dec. 28, 1948 |
| 2,552,530 | De Groote | May 15, 1951 |
| 2,574,544 | De Groote | Nov. 13, 1951 |
| 2,589,200 | Monson | Mar. 11, 1952 |
| 2,622,099 | Ferrero et al. | Dec. 16, 1952 |
| 2,649,483 | Huscher et al. | Aug. 18, 1953 |
| 2,677,700 | Jackson et al. | May 4, 1954 |